(12) United States Patent
Iizuka et al.

(10) Patent No.: US 10,982,680 B2
(45) Date of Patent: Apr. 20, 2021

(54) TURBOCHARGER IMPELLER

(71) Applicant: IHI Corporation, Koto-ku (JP)

(72) Inventors: Kuniaki Iizuka, Koto-ku (JP); Takashi Yoshida, Koto-ku (JP); Yuji Sasaki, Koto-ku (JP); Tatsumi Inomata, Koto-ku (JP); Takuya Ozasa, Koto-ku (JP); Tomohisa Okada, Koto-ku (JP); Ryosuke Yumoto, Koto-ku (JP); Kouta Kimachi, Koto-ku (JP)

(73) Assignee: IHI Corporation, Koto-ku (JP)

( * ) Notice: Subject to any disclaimer, the term of this patent is extended or adjusted under 35 U.S.C. 154(b) by 262 days.

(21) Appl. No.: 16/324,925

(22) PCT Filed: Jul. 27, 2017

(86) PCT No.: PCT/JP2017/027318
§ 371 (c)(1),
(2) Date: Feb. 12, 2019

(87) PCT Pub. No.: WO2018/042967
PCT Pub. Date: Mar. 8, 2018

(65) Prior Publication Data
US 2021/0054851 A1 Feb. 25, 2021

(30) Foreign Application Priority Data
Sep. 2, 2016 (JP) .............................. JP2016-171976

(51) Int. Cl.
*F04D 29/28* (2006.01)
*F04D 29/02* (2006.01)
*F02C 6/12* (2006.01)

(52) U.S. Cl.
CPC .............. *F04D 29/284* (2013.01); *F02C 6/12* (2013.01); *F04D 29/023* (2013.01);
(Continued)

(58) Field of Classification Search
CPC ........ F04D 29/284; F04D 29/023; F02C 6/12; F05B 2280/1021; F05B 2280/6015; F05B 2250/231; F05D 2220/40
See application file for complete search history.

(56) References Cited

U.S. PATENT DOCUMENTS

| | | |
|---|---|---|
| 2011/0243485 A1 | 10/2011 | Kume et al. |
| 2012/0124994 A1 | 5/2012 | Hommes et al. |

(Continued)

FOREIGN PATENT DOCUMENTS

| | | |
|---|---|---|
| CN | 103649545 A | 3/2014 |
| CN | 104350284 A | 2/2015 |

(Continued)

OTHER PUBLICATIONS

International Search Report dated Aug. 29, 2017 in PCT/JP2017/027316, 2 pages.

(Continued)

*Primary Examiner* — Audrey K Bradley
*Assistant Examiner* — Edward Bushard
(74) *Attorney, Agent, or Firm* — Oblon, McClelland, Maier & Neustadt, L.L.P.

(57) ABSTRACT

A turbocharger impeller includes: a cylindrical boss portion disposed around a rotary axis; a hub portion connected to the boss portion and extends in a radial direction of the rotary axis; and a blade portion protruding from the boss portion and the hub portion toward a tip end side in the direction of the rotary axis and the radial direction. At least a part of an outer peripheral part of the hub portion in the radial direction or a part of the blade portion is provided with a resin second section and the second section is bonded to an aluminum first section. The turbocharger impeller includes the aluminum first section and the resin second section.

12 Claims, 7 Drawing Sheets

(52) U.S. Cl.
CPC . *F05B 2250/231* (2013.01); *F05B 2280/1021* (2013.01); *F05B 2280/6015* (2013.01); *F05D 2220/40* (2013.01)

(56) References Cited

U.S. PATENT DOCUMENTS

| | | |
|---|---|---|
| 2014/0090626 A1 | 4/2014 | An et al. |
| 2014/0341715 A1 | 11/2014 | Baehmann et al. |
| 2015/0093247 A1 | 4/2015 | Asano et al. |
| 2015/0361993 A1 | 12/2015 | An et al. |

FOREIGN PATENT DOCUMENTS

| | | | |
|---|---|---|---|
| DE | 10 2011 116 890 A1 | | 5/2012 |
| GB | 1 341 578 A | | 12/1973 |
| JP | 62-110599 U | | 7/1987 |
| JP | 62-203999 U | | 12/1987 |
| JP | 63-87237 U | | 6/1988 |
| JP | 3-141698 A | | 6/1991 |
| JP | 03141898 A | * | 6/1991 |
| JP | 5-79346 A | | 3/1993 |
| JP | 6-93871 A | | 4/1994 |
| JP | 10-212967 A | | 8/1998 |
| JP | 2002-349202 A | | 12/2002 |
| JP | 2010-275878 A | | 12/2010 |
| JP | 2011-74763 A | | 4/2011 |
| JP | 2012-149583 A | | 8/2012 |
| JP | 2015-500438 A | | 1/2015 |
| JP | 2016-108985 A | | 6/2016 |
| JP | 2016-108986 A | | 6/2016 |
| WO | WO 2008/128954 A1 | | 10/2008 |

OTHER PUBLICATIONS

Japanese Office Action dated Jun. 18, 2019, in Patent Application No. 2018-537038, 5 pages (submitting English translation only).

* cited by examiner

TURBOCHARGER IMPELLER

TECHNICAL FIELD

The present disclosure relates to a turbocharger impeller.

BACKGROUND ART

As a turbocharger impeller, for example, aluminum impeller is known. In general, a resin impeller is also known as disclosed in Patent Documents 1 and 2. The resin impeller can be employed for a decrease in weight. A material of the compressor impeller disclosed in Patent Document 1 is a carbon fiber reinforced resin or the like which is a resin containing a polymer material or a polymer-based composite material. A shaft of the impeller is fastened at an elastic limit load or less of the impeller at a maximum use temperature. In the impeller disclosed in Patent Document 2, special engineering plastics such as polyetheretherketone (PEEK) are used. On the rear surface side of the impeller, a reinforcing fiber sheet knitted with a carbon fiber and a glass fiber is integrally molded. The reinforcing fiber sheet reinforces the rear surface side of the impeller.

CITATION LIST

Patent Literature

Patent Document 1: Japanese Unexamined Patent Publication No. H5-079346

Patent Document 2: Japanese Unexamined Patent Publication No. H6-093871

SUMMARY OF INVENTION

Technical Problem

The density of the resin is smaller than that of the aluminum. For that reason, there is an advantage that the resin impeller is effective for a decrease in weight. However, since the strength of the resin is lower than that of the aluminum, it is difficult to apply the resin to a position in which the stress is high. Therefore, the aluminum impeller is generally used in many cases. Meanwhile, the strength of the aluminum is higher than that of the resin, but is lower than that of the resin from the viewpoint of a decrease in inertia. The present disclosure provides a turbocharger impeller having low inertia.

Solution to Problem

A turbocharger impeller according to one embodiment of the present disclosure includes: a cylindrical boss portion disposed around a rotary axis; a hub portion connected to the boss portion and extends in a radial direction of the rotary axis; and a blade portion protruding from the boss portion and the hub portion toward a tip end side in the direction of the rotary axis and the radial direction. At least a part of an outer peripheral part of the hub portion in the radial direction or a part of the blade portion is provided with a resin second section and the second section is bonded to an aluminum first section. The turbocharger impeller includes the aluminum first section and the resin second section.

Effects of Invention

According to one embodiment of the present disclosure, a turbocharger impeller having low inertia is realized.

DESCRIPTION OF EMBODIMENTS

Figure 1:
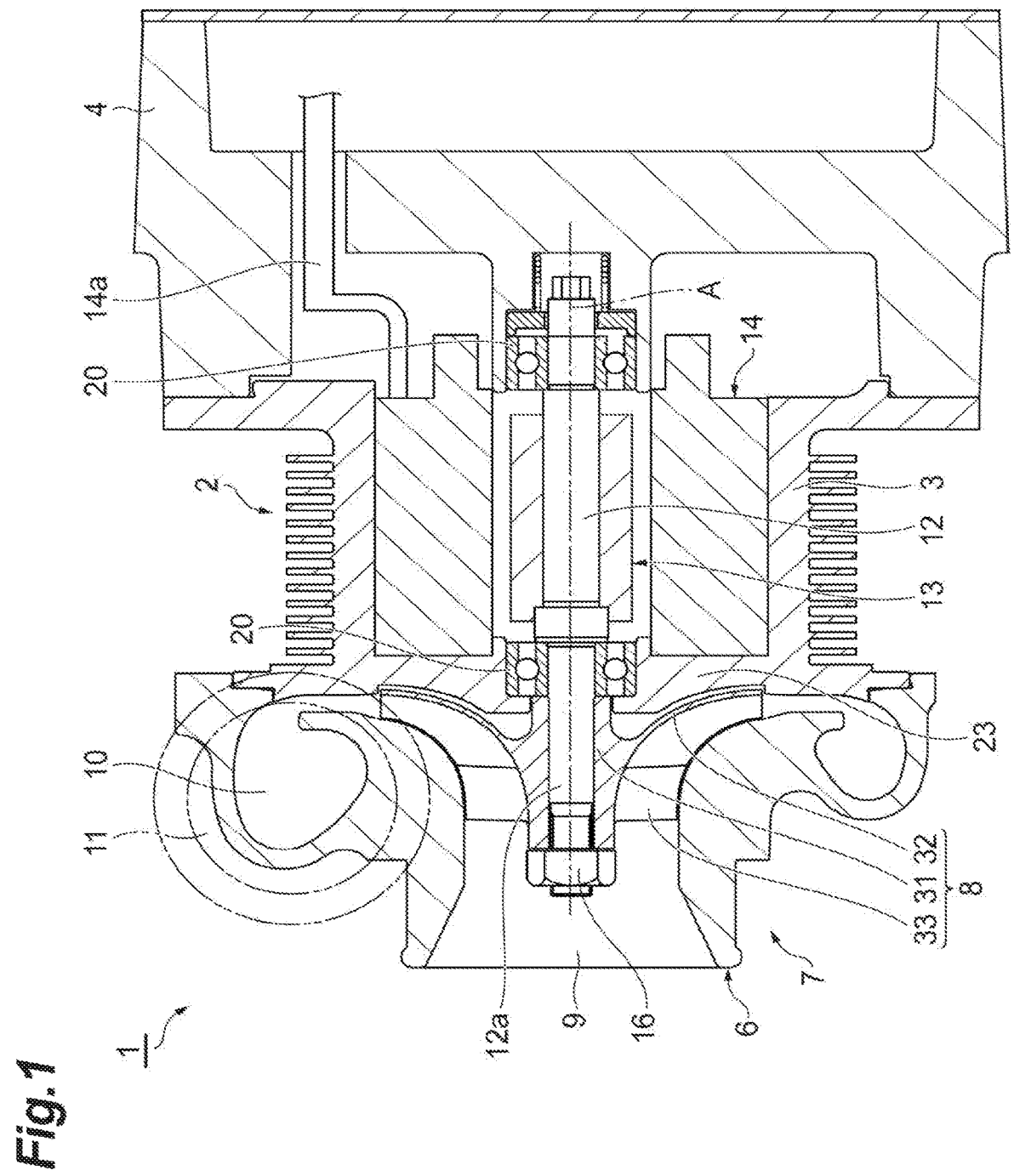
FIG. 1 is a cross-sectional view of an electric turbocharger that adopts an impeller according to an embodiment of the present disclosure.

A turbocharger impeller according to one embodiment of the present disclosure includes: a cylindrical boss portion disposed around a rotary axis; a hub portion connected to the boss portion and extends in a radial direction of the rotary axis; and a blade portion protruding from the boss portion and the hub portion toward a tip end side in the direction of the rotary axis and the radial direction. At least a part of an outer peripheral part of the hub portion in the radial direction or a part of the blade portion is provided with a resin second section and the second section is bonded to an aluminum first section. The turbocharger impeller includes the aluminum first section and the resin second section.

According to the turbocharger impeller, the resin second section is provided in at least a part of the outer peripheral part of the hub portion in the radial direction or a part of the blade portion. In order to realize the low inertia, the present inventors paid attention to the stress (or the stress distribution) generated during the operation of the turbocharger in the turbocharger impeller equipped with the turbocharger. The stress of the outer peripheral part of the hub portion is lower than that of the inner peripheral part. Further, a low stress part also exists in the blade portion. The low stress part can be set as the second section formed of resin and having strength relatively lower than that of the aluminum. The mass of the resin is smaller than the mass of the aluminum. Thus, the turbocharger impeller having low inertia is realized. As a result, the turbo lag of the turbocharger is reduced.

In some embodiments, the second section is provided on the outer peripheral side of the first section. Since the outer peripheral side largely contributes to the inertia, this configuration further improves the low inertia of the turbocharger impeller.

In some embodiments, the second section is provided on an outer peripheral side in relation to a predetermined radius and the first section is provided on an inner peripheral side in relation to the predetermined radius. The resin second section is provided at the outside of the cylindrical surface of the predetermined radius as a boundary (the bonding surface) and the aluminum first section is provided at the inside thereof. Since the outer peripheral side largely contributes to the inertia, this configuration further improves the low inertia of the turbocharger impeller. Since the bonding surface is provided at a position of the predetermined radius, a comparatively simple configuration can be obtained and hence there is an advantage from the viewpoint of design and manufacture.

In some embodiments, the second section is provided in at least an area between the blade portions of the hub portion. In the hub portion, the root of the blade portion, that is, the periphery of a base part can have high stress. Meanwhile, in the hub portion, an area other than these areas has low stress. Since the low stress area is provided with the second section, it is possible to further improve the low inertia of the turbocharger impeller while ensuring necessary strength.

In some embodiments, the base part of the blade portion connected to the hub portion is formed as the first section and a part protruding from the base part of the blade portion is formed as the second section. In the blade portion, the root, that is, the periphery of the base part can have high stress. Meanwhile, in the blade portion, a part protruding from the base part has low stress. According to this configuration, the advantage of each of the aluminum and the resin is exhibited and both low inertia and securement of necessary strength are obtained in response to the function of the turbocharger impeller.

In some embodiments, a ratio of the second section with respect to all of the first section and the second section increases from the boss portion outward in the radial direction. In the turbocharger impeller, there is a tendency that the stress decreases as it goes outward in the radial direction. The outside in the radial direction in which the stress is low can be provided with the second section formed of resin and having strength relatively lower than that of the aluminum. Since the outside in the radial direction largely contributes to the inertia, according to the above-described configuration, the turbocharger impeller having low inertia is realized. As a result, the turbo lag of the turbocharger is reduced.

Hereinafter, an embodiment of the present disclosure will be described with reference to the drawings. Furthermore, in the description of the drawings, the same reference numerals will be given to the same components and a repetitive description thereof will be omitted.

Referring to FIG. 1, an electric turbocharger that adopts a turbocharger impeller according to an embodiment will be described. As illustrated in FIG. 1, an electric turbocharger 1 is applied to, for example, an internal combustion engine of a vehicle or a ship. The electric turbocharger 1 includes a compressor 7. The electric turbocharger 1 generates compressed air by rotating a compressor impeller 8 in terms of the interaction of a rotor part 13 and a stator part 14 to compress a fluid such as air.

The electric turbocharger 1 includes a rotary shaft 12 which is supported to be rotatable inside a housing 2 and the compressor impeller (a turbocharger impeller) 8 which is fastened to a tip end part 12a of the rotary shaft 12. The housing 2 includes a motor housing 3 which accommodates the rotor part 13 and the stator part 14 and a base housing 4 which closes an opening of the other end side of the motor housing 3 (the right side of the drawing). A compressor housing 6 which accommodates the compressor impeller 8 is provided at one end side of the motor housing 3 (the left side of the drawing). The compressor housing 6 includes a suction port 9, a scroll part 10, and an ejection port 11.

The rotor part 13 is attached to a center part of the rotary shaft 12 in the axial direction and includes one or a plurality of permanent magnets (not illustrated) attached to the rotary shaft 12. The stator part 14 is attached to an inner surface of the motor housing 3 to surround the rotor part 13 and includes a coil part (not illustrated) on which a wire 14a is wound. When an AC current flows to the coil part of the stator part 14 through the wire 14a, the rotary shaft 12 and the compressor impeller 8 rotate together by the interaction between the rotor part 13 and the stator part 14. When the compressor impeller 8 rotates, the compressor impeller 8 sucks external air through the suction port 9, compresses air through the scroll part 10, and ejects the air from the ejection port 11. The compressed air which is ejected from the ejection port 11 is supplied to the above-described internal combustion engine.

The electric turbocharger 1 includes two bearings 20 which are press-inserted into the rotary shaft 12 and rotatably support the rotary shaft 12 with respect to the housing 2. The bearing 20 supports the rotary shaft 12 with both ends thereof. One bearing 20 is provided at an end part on the side of the compressor impeller 8 in the motor housing 3. The other bearing 20 is provided in a support wall part 23 which protrudes from the base housing 4 in the axial direction of the rotary shaft 12. The compressor impeller 8 is fastened to the rotary shaft 12 by a shaft end nut 16 provided in the tip end part 12a of the rotary shaft 12.

Figure 2:
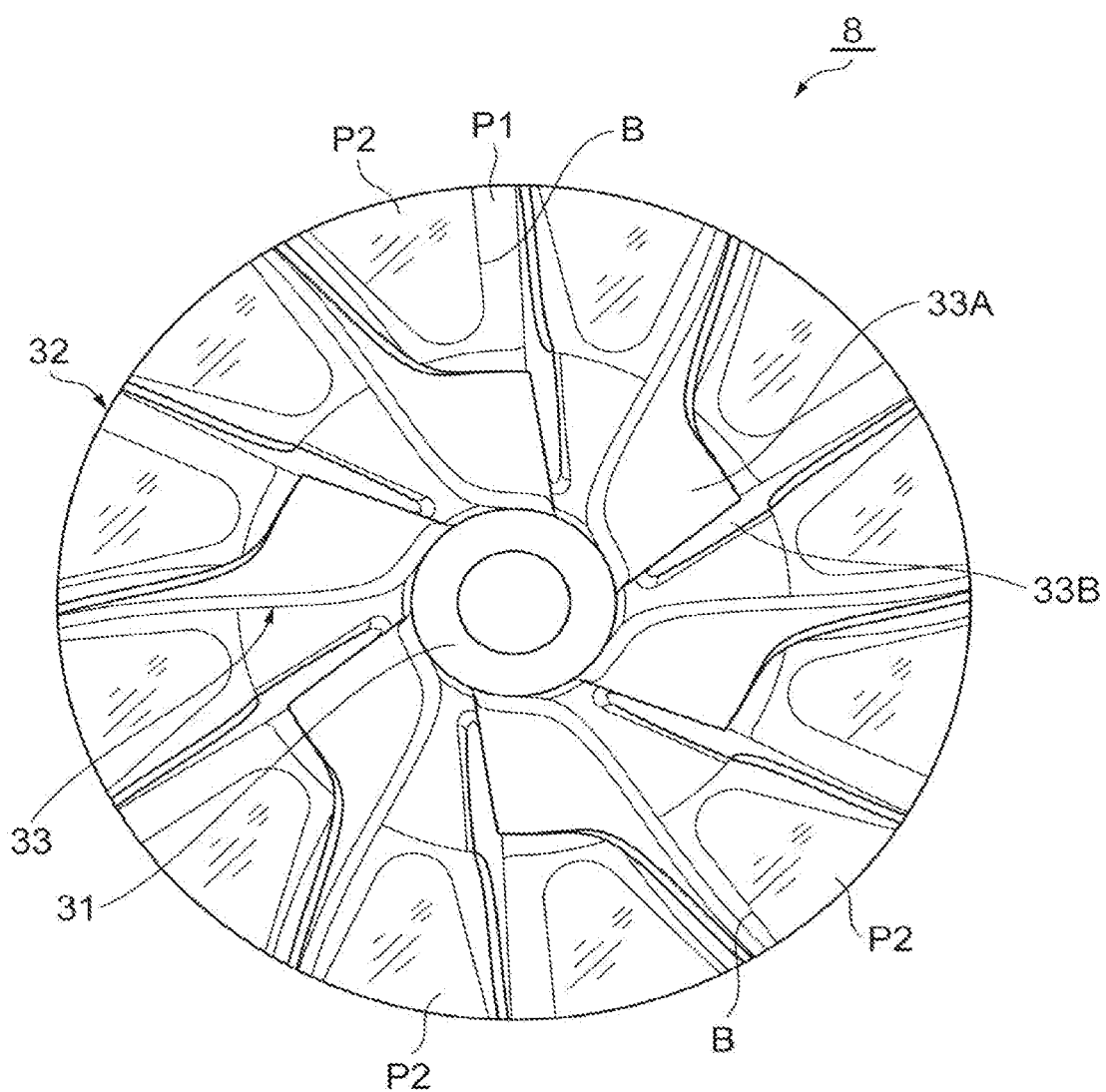
FIG. 2 is a plan view illustrating the impeller according to the embodiment.

Next, the compressor impeller 8 of the electric turbocharger 1 will be described in detail with reference to FIGS. 1 and 2. As illustrated in FIGS. 1 and 2, the compressor impeller 8 includes a cylindrical boss portion 31 which is disposed in the periphery of a rotary axis A and through which the rotary shaft 12 penetrates, a hub portion 32 which is connected to the boss portion 31 and extends in the radial direction of the rotary shaft 12 (the rotary axis A), and a blade portion 33 which protrudes from the boss portion 31 and the hub portion 32 toward one end side (the left side of the drawing) in the radial direction and the direction of the rotary axis A.

Figure 6:
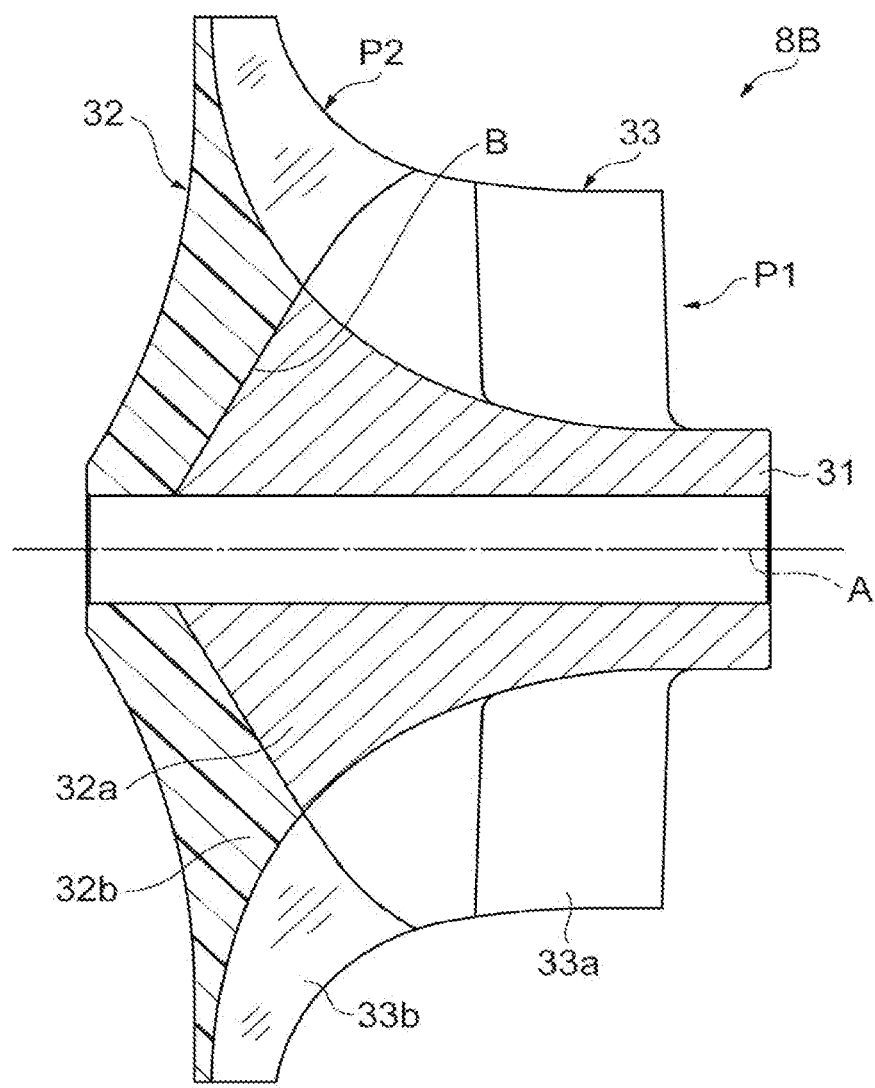
FIG. 6 is a cross-sectional view taken along an axis of an impeller according to still another embodiment.

As illustrated in FIG. 1, the boss portion 31 comes into contact with an inner race of the bearing 20 and receives a fastening force in the direction of the rotary axis A by the shaft end nut 16. The hub portion 32 has a curved surface. A shape of a rear surface side of the hub portion 32 may be formed in a recessed shape as illustrated in FIG. 1 or may be formed in a shape protruding toward the bearing 20 as illustrated in FIG. 6. The rear surface side of the hub portion 32 may be a flat surface perpendicular to the rotary axis A. The blade portion 33 has a three-dimensional shape in response to the performance required for the compressor impeller 8. As illustrated in FIG. 2, the blade portion 33 includes a plurality of full blades 33A (long blades) and a plurality of splitter blades 33B (short blades). The same number of the full blades 33A and the splitter blades 33B are provided and are alternately arranged in the circumferential direction. Furthermore, there is also a case in which the blade portion is not provided with the splitter blade 33B (short blade).

As illustrated in FIG. 2, the compressor impeller 8 is formed of two different materials. The compressor impeller 8 includes an aluminum first section P1 and a resin second section P2. That is, the compressor impeller 8 is formed by a combination of two kinds of members. The first section P1 is denser than the second section P2. Regarding the first section P1, the "aluminum" includes the case of pure aluminum and the case of a material containing aluminum. The resin material forming the second section P2 is not particularly limited, but may be, for example, a polyphenylene sulfide (PPS) resin or a polyether ether ketone (PEEK) resin.

The resin second section P2 is bonded to the aluminum first section P1. A method of manufacturing the compressor impeller 8 is not particularly limited, but the compressor impeller can be molded according to, for example, a nano molding method. Specifically, an impeller intermediate body of only the first section P1 in which an area planned as the second section P2 is hollow (omitted) is first manufactured and then resin is molded by injection-molding in the area planned as the second section P2 to be bonded to an aluminum part. A bonding surface B which is a joint surface thereof exists between the first section P1 and the second section P2. When the compressor impeller 8 is formed by the nano-molding method, a surface corresponding to the bonding surface B of the first section P1 may be subjected to an interface treatment. Furthermore, also in the following embodiments, the same manufacturing method can be applied.

In the compressor impeller 8 illustrated in FIG. 2, the second section P2 is provided only in an area between the blade portions 33 of the hub portion 32. In other words, the second section P2 is provided only in an area between the full blade 33A and the splitter blade 33B. Meanwhile, the boss portion 31 and the blade portion 33 are formed as the aluminum first section P1. Furthermore, in FIG. 2, the surface of the resin section and the surface of the aluminum section are drawn so as to be different from each other.

In the compressor impeller 8, as described above, the second section P2 is provided in a part on the outer peripheral side in the radial direction. In other words, a part of the outer peripheral part of the hub portion 32 is formed as the second section P2. Each of the first section P1 and the second section P2 forms a part of the boss portion 31, the hub portion 32, or the blade portion 33 of the compressor impeller 8. That is, in the compressor impeller 8, any one of the first section P1 and the second section P2 is not attached to reinforce the other. In the compressor impeller 8, the entire thickness of the boss portion 31, the hub portion 32, or the blade portion 33 is formed as the first section P1 or the second section P2. In this respect, the present disclosure is different from the invention disclosed in Patent Document 2.

The bonding surface B is framed from the front surface side to the rear surface side of the hub portion 32. The bonding surface B extends from the outer peripheral edge of the compressor impeller 8 toward the rotary axis A and extends to the outer peripheral edge again. In this way, the bonding surface B is formed in a V shape or a U shape as viewed from the direction of the rotary axis A. In the compressor impeller 8, the second section P2 occupies a large volume as compared with the first section P1 in the outer peripheral part of the hub portion 32 in the radial direction.

Figure 5:
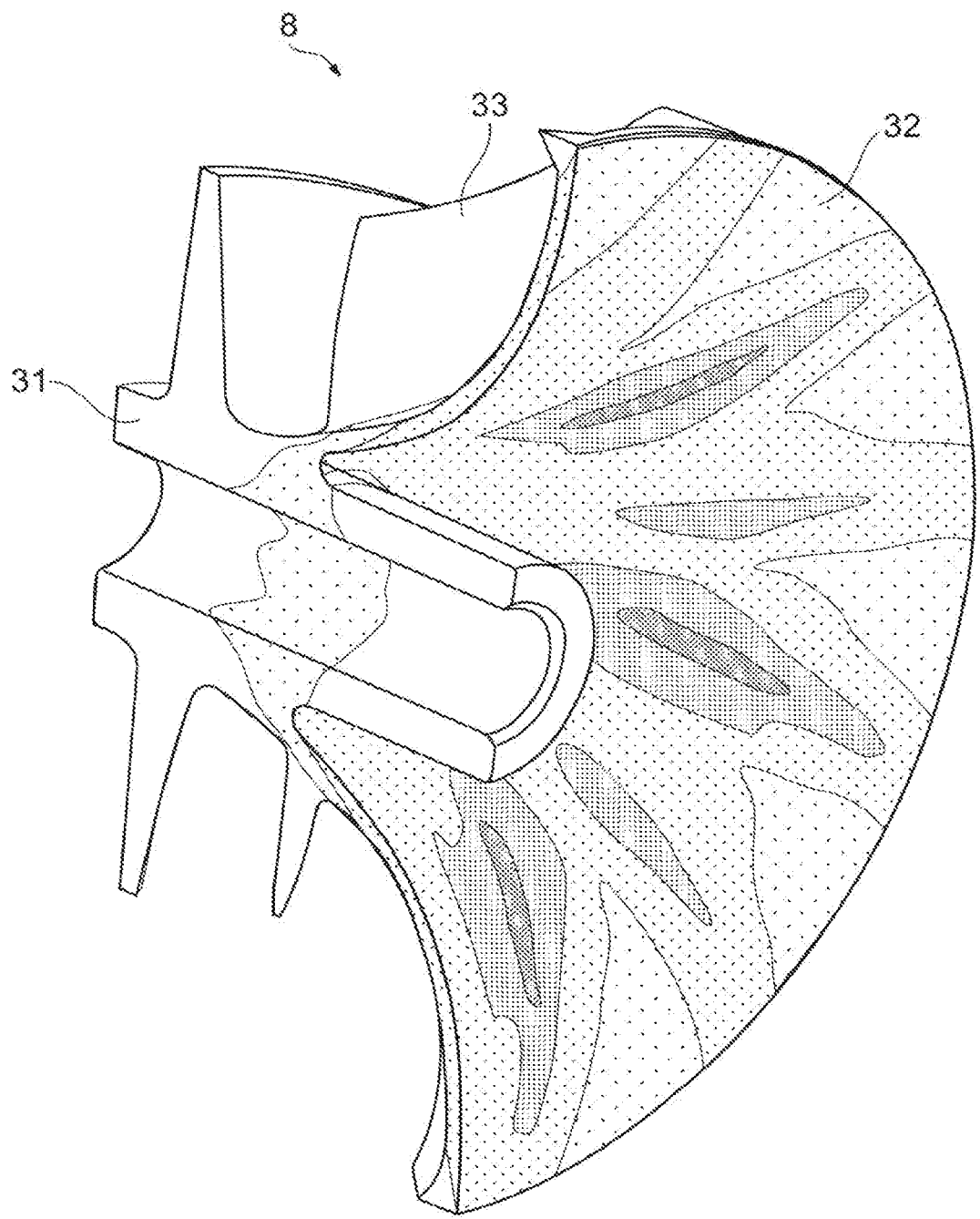
FIG. 5 is a diagram illustrating an analysis result of a stress distribution of the impeller and is a diagram illustrating a cross-section of a boss portion of the impeller.

In the compressor impeller 8, an area of the second section P2 can be determined based on a stress distribution. The stress distribution is a distribution of stress which can be generated at the time of operating the electric turbocharger 1 and can be obtained by a calculation based on the number of rotations and data indicating the shape, the size, and the material (specific weight) of the compressor impeller 8. Furthermore, only a centrifugal stress distribution generated at the time of the rotation of the compressor impeller 8 is illustrated in FIG. 5 illustrating an analysis result of a stress distribution of the compressor impeller 8. In fact, an axial fastening force due to the tightening of the shaft end nut 16 is applied to the boss portion 31. Due to the friction of the fastening force, a deviation in rotation of the compressor impeller 8 with respect to the rotary shaft 12 can be prevented. In this way, a certain axial force or more is necessary in order to prevent a deviation in rotation of the compressor impeller 8.

Figure 4:
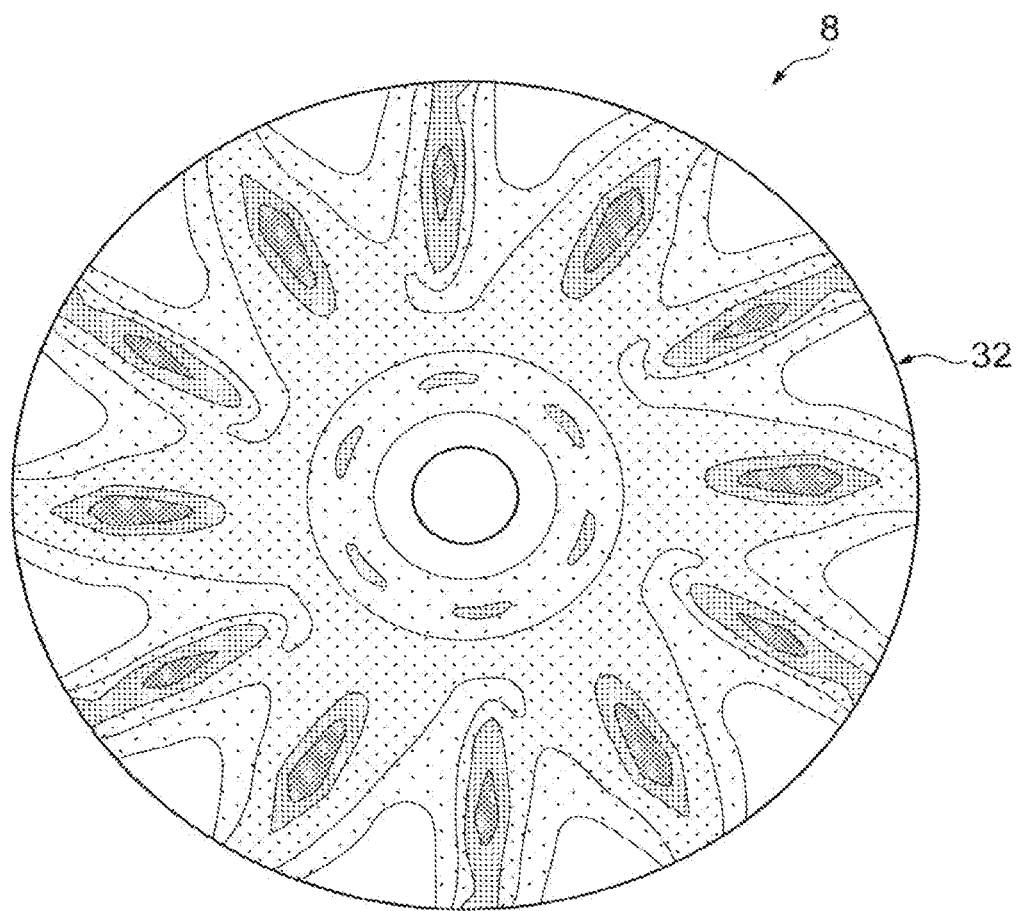
FIG. 4 is a diagram illustrating an analysis result of a stress distribution of the impeller and is a diagram illustrating a rear surface side of the impeller.

FIG. 4 is a diagram illustrating an analysis result of a stress distribution of the compressor impeller 8 and is a diagram illustrating the rear surface side of the compressor impeller 8. Such a stress distribution can be obtained by, for example, a finite element method (FEM). In FIG. 4, an area having high stress is shown by a high-density point. As illustrated in FIG. 4, a low stress area can be seen in the boss portion 31 or between the blade portions 33, but a high stress area can be seen, for example, in the vicinity of a root of the blade portion 33.

In the analysis result of the stress distribution, an area having stress smaller than a predetermined stress threshold value is provided with the second section P2. An area having stress larger than the predetermined stress threshold value is provided with the first section P1. Furthermore, the bonding surface B which is a boundary between the first section P1 and the second section P2 does not need to precisely match a part having the predetermined stress threshold value. The stress threshold value may be used as a reference. For example, the shape and the position of the bonding surface B may be appropriately determined in consideration of easiness in manufacturing, cost, and the like based on the stress threshold value.

In the compressor impeller 8, the second section P2 is provided in a part of the outer peripheral part of the hub portion 32 which is a low stress part and has a large influence on the inertia. Furthermore, in the FEM analysis result, the boss portion 31 becomes a low stress area, but the boss portion 31 needs strength since a stress is generated by the shaft end nut 16 as described above. Since the resin is inferior to aluminum in terms of strength, the boss portion 31 is not suitable for the resin second section P2. Particularly, in the application of the electric turbocharger 1, the boss portion 31 needs strength in consideration of the use at a high rotation speed. Due to this viewpoint, the boss portion 31 of the compressor impeller 8 of the present disclosure is formed as the aluminum first section P1 at all times. As for the hub portion 32, a part connected to the boss portion 31 and a part connected to the blade portion 33 (the root of the blade portion 33) are formed as the first section P1.

According to the compressor impeller 8 of the embodiment, the resin second section P2 is provided in a part of the outer peripheral part of the hub portion 32 in the radial direction. The stress of the outer peripheral part of the hub portion 32 is lower than that of the inner peripheral part. The outer peripheral part of the hub portion 32 having low stress can be formed as the second section P2 formed of resin and having strength relatively lower than that of aluminum. The mass of the resin is smaller than the mass of aluminum. Thus, the compressor impeller 8 having low inertia is realized. As a result, the turbo lag of the electric turbocharger 1 is reduced. That is, in the compressor impeller 8, since the moment of inertia is small as compared with the aluminum impeller as a whole, the acceleration at the time of rising is excellent. Accordingly, a particularly advantageous effect is exhibited in the electric turbocharger 1 in which the compressor impeller 8 rotates at a high rotation speed (that is, a high circumferential speed). Compared with the aluminum compressor impeller as a whole, a decrease in weight is realized as well as a high circumferential speed and high performance.

There is a stress distribution in the compressor impeller 8 which rotates while being fastened to the rotary shaft 12 through the shaft end nut 16. Further, since low inertia is also necessary to reduce the turbo lag of the electric turbocharger 1, both of them are compatible. In the compressor impeller 8, the stress distribution is checked by FEM, the advantages and disadvantages of the aluminum and the resin are sufficiently understood, and components are respectively disposed in the areas capable of exhibiting the advantages of the aluminum and the resin in sufficient consideration of the function of the compressor impeller 8. With this configuration, a sufficient effect can be obtained by using the advantages of the aluminum and the resin as compared with a simple combination of two kinds of materials.

In the compressor impeller 8, the second section P2 occupies a large volume as compared with the first section P1 in the outer peripheral part of the hub portion 32 in the radial direction. Since the outer peripheral part largely contributes to the inertia, according to the compressor impeller 8, the compressor impeller 8 having low inertia is realized.

As viewed from the compressor impeller 8 on the whole, the inner peripheral side is formed as the first section P1 and the outer peripheral side is mainly formed as the second section P2. That is, the second section P2 is provided on the outer peripheral side of the first section P1. Since the outer peripheral side largely contributes to the inertia, this configuration further improves the low inertia of the compressor impeller 8.

The second section P2 is provided in an area between the blade portions 33 of the hub portion 32. In the hub portion 32, the root of the blade portion 33, that is, the periphery of the base part can have high stress. Meanwhile, in the hub portion 32, an area other than these areas has low stress. Since the low stress area is provided with the second section P2, it is possible to further improve the low inertia of the compressor impeller 8 while ensuring necessary strength.

Figure 3B:
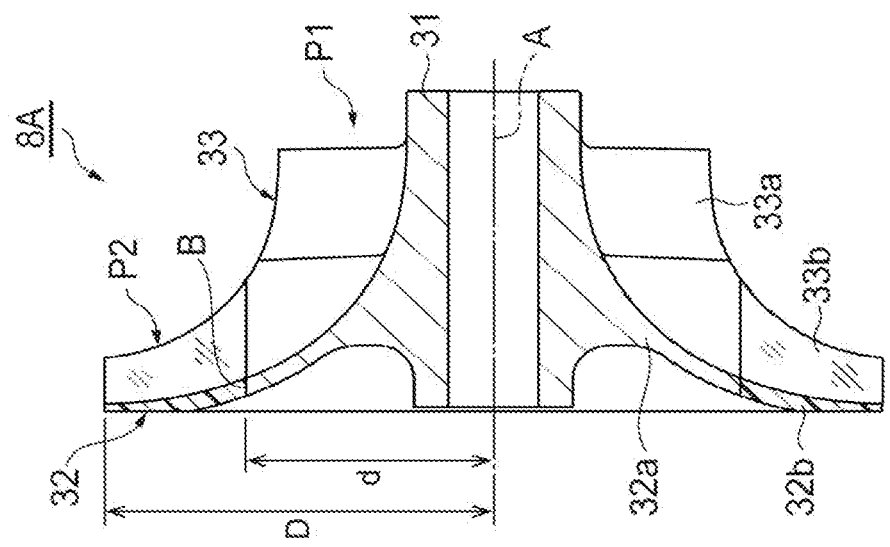
FIG. 3A is a plan view illustrating an impeller according to another embodiment and FIG. 3B is a cross-sectional view taken along an axis of the impeller of FIG. 3A.
Figure 3A:
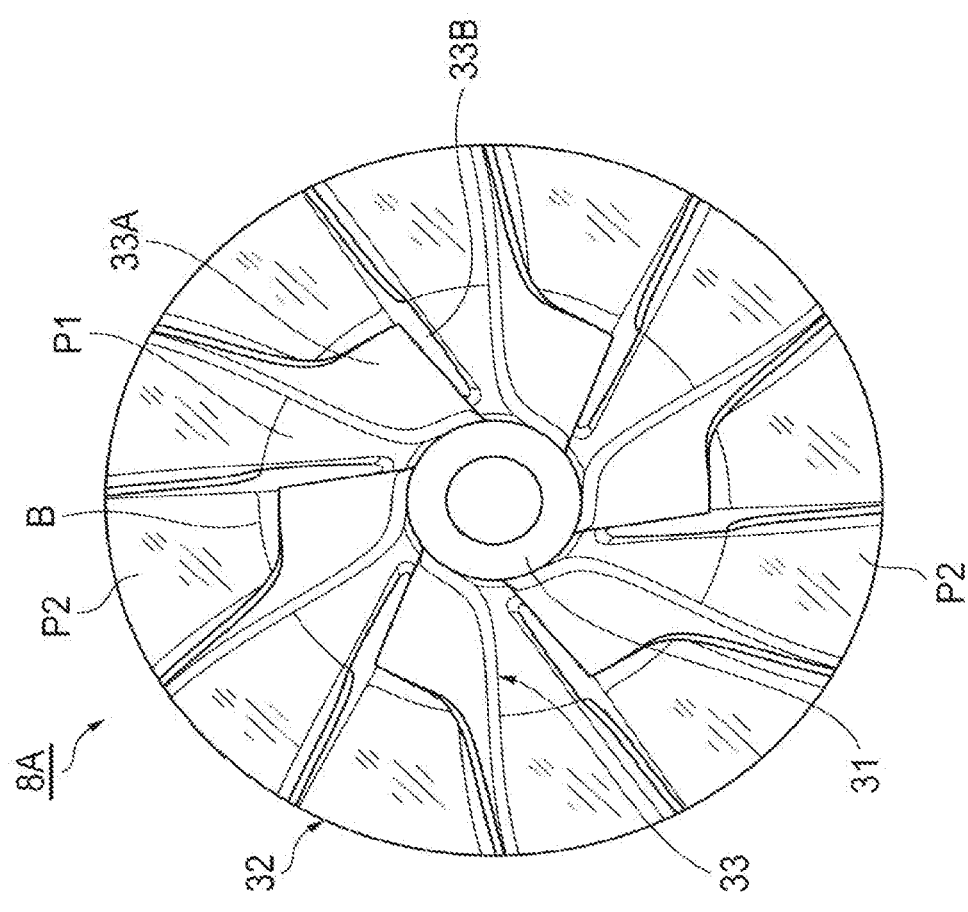

Subsequently, a compressor impeller 8A according to another embodiment will be described with reference to FIGS. 3A and 3B. In the compressor impeller 8A, the resin second section P2 is provided at the outside of the cylindrical bonding surface B of a predetermined radius d as a boundary and the aluminum first section P1 is provided at the inside thereof. The predetermined radius d is smaller than the radius D of the compressor impeller 8A. In the compressor impeller 8A, the entire area on the outer peripheral side from the radius d to the radius D of the compressor impeller 8A is formed as the second section P2. That is, an outer peripheral part 32b of the hub portion 32 and an outer peripheral part 33b of the blade portion 33 included in the area on the outer peripheral side from the radius d to the radius D are formed of resin. The boss portion 31, an inner peripheral part 32a of the hub portion 32, and an inner peripheral part 33a of the blade portion 33 included in an area on the inner peripheral side from the rotary axis A to the radius d are formed of aluminum.

Also in the compressor impeller 8A, the bonding surface B is formed from the front surface sides to the rear surface sides of the hub portion 32 and the blade portion 33. In the compressor impeller 8A, the first section P1 is not provided in the outer peripheral part of the hub portion 32 in the radial direction. Thus, the second section P2 occupies a large volume as compared with the first section P1 in the outer peripheral part of the hub portion 32 in the radial direction.

Each area of the first section P1 and the second section P2 in the compressor impeller 8A can be determined based on the stress distribution similarly to the compressor impeller 8.

According to the compressor impeller 8A, the same operational effects as those of the compressor impeller 8 can be obtained. That is, the compressor impeller 8A having low inertia is realized. As a result, the turbo lag of the electric turbocharger 1 is reduced. That is, in the compressor impeller 8A, since the moment of inertia is small as compared with the aluminum impeller as a whole, the acceleration at the time of rising is excellent.

In the compressor impeller 8A, the second section P2 is provided in at least an area between the blade portions 33 of the hub portion 32. Further, the second section P2 is provided on the outer peripheral side of the first section P1. Since the outer peripheral side largely contributes to the inertia, this configuration further improves the low inertia of the turbocharger impeller.

The second section P2 is provided on the outer peripheral side in relation to the predetermined radius d and the first section P1 is provided on the inner peripheral side in relation to the predetermined radius d. The resin second section P2 is provided at the outside of the cylindrical surface of the predetermined radius d as a boundary (the bonding surface B) and the aluminum first section P1 is provided at the inside thereof. Since the outer peripheral side largely contributes to the inertia, this configuration further improves the low inertia of the compressor impeller 8A. Since the bonding surface B is provided at a position of the predetermined radius d, a comparatively simple configuration can be obtained and hence there is an advantage from the viewpoint of design and manufacture.

Figure 7:
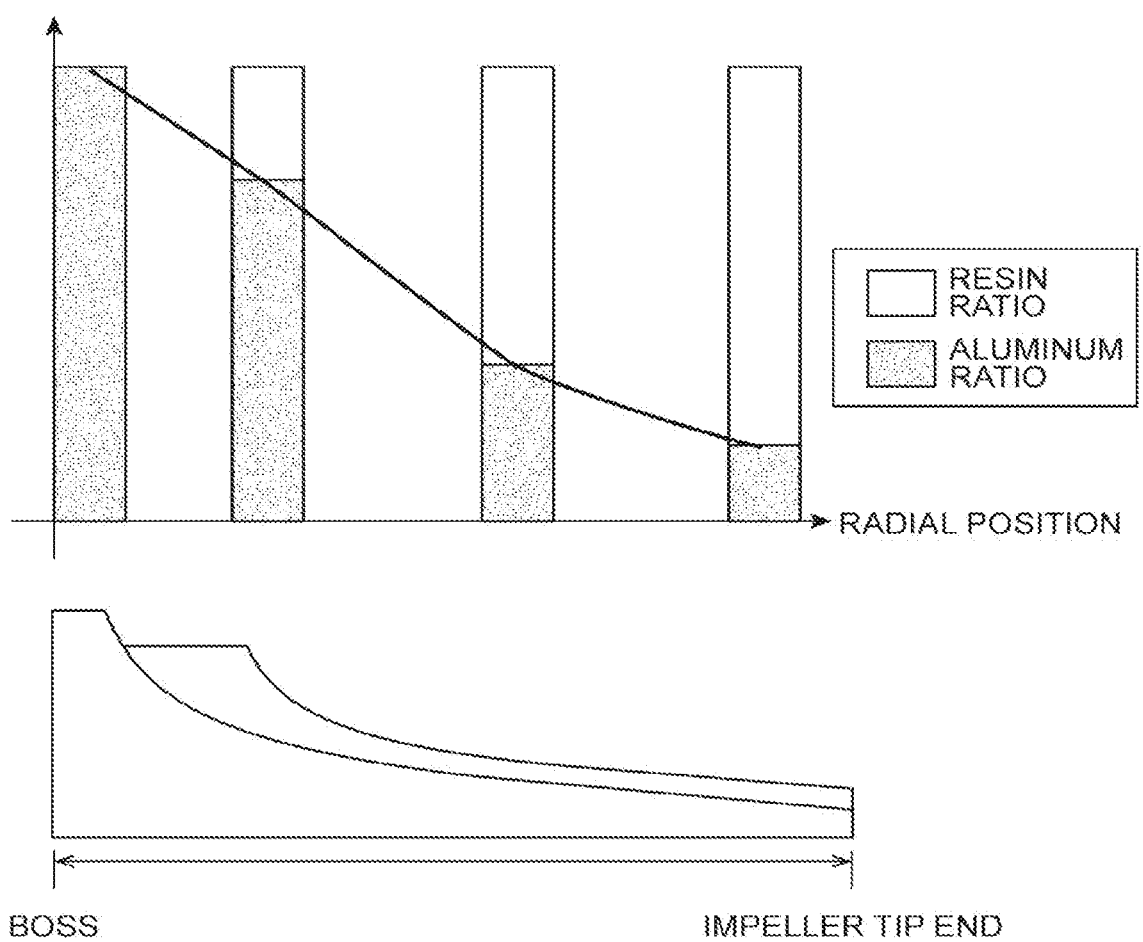
FIG. 7 is a diagram illustrating a ratio of aluminum and resin of the impeller in accordance with a radial position.

Subsequently, a compressor impeller 8B according to still another embodiment will be described with reference to FIGS. 6 and 7. As illustrated in FIGS. 6 and 7, in the compressor impeller 8B, a ratio of the second section with respect to all of the first section P1 and the second section P2 increases from the boss portion 31 outward in the radial direction. That is, the first section P1 and the second section P2 are provided in any one of the boss portion 31, the hub portion 32, and the blade portion 33. The bonding surface B is formed in a substantially conical shape (a conical shape of which a diameter decreases toward the motor housing 3). As illustrated in FIGS. 6 and 7, a ratio of the aluminum becomes higher toward the boss portion 31 and a ratio of the resin becomes higher outward in the radial direction (that is, toward the tip end of the blade portion 33).

In the compressor impeller 8B, the bonding surface B is formed from the front surface sides of the hub portion 32 and the blade portion 33 to the inner peripheral surface of the boss portion 31 (the peripheral surface of the through-hole through which the rotary shaft 12 passes). In the compressor impeller 8B, the second section P2 occupies a large volume as compared with the first section P1 in the outer peripheral part of the hub portion 32 in the radial direction.

Each area of the first section P1 and the second section P2 of the compressor impeller 8B can be determined based on the stress distribution similarly to the compressor impeller 8.

According to the compressor impeller 8B, the same operational effects as those of the compressor impeller 8 are obtained. That is, the compressor impeller 8B having low inertia is realized. As a result, the turbo lag of the electric turbocharger 1 is reduced. That is, in the compressor impeller 8B, since the moment of inertia is small as compared with the aluminum impeller as a whole, the acceleration at the time of rising is excellent.

In the compressor impeller 8B, the second section P2 is provided in at least an area between the blade portions 33 of the hub portion 32. Further, the second section P2 is provided on the outer peripheral side of the first section P1. Since the outer peripheral side largely contributes to the inertia, this configuration further improves the low inertia of the turbocharger impeller.

A ratio of the second section P2 with respect to all of the sections increases from the boss portion 31 outward in the radial direction. In the compressor impeller 8B, the stress becomes lower outward in the radial direction. The second section P2 formed of resin and having strength relatively lower than that of the aluminum can be provided at the outside in the radial direction in which the stress is low. The outside in the radial direction largely contributes to the inertia. Thus, the compressor impeller 8B having low inertia is realized.

The embodiments of the present disclosure have been described, but the present invention is not limited to the above-described embodiments. For example, a compressor impeller may be formed such that the base part of the blade portion 33 connected to the hub portion 32 is formed as the first section P1 and a part protruding from the base part of the blade portion 33 is formed as the second section P2. In the blade portion 33, the root, that is, the periphery of the base part can have high stress. Meanwhile, in the blade portion 33, a part protruding from the base part has low stress. According to this configuration, the advantage of each of the aluminum and the resin is exhibited and both low inertia and securement of necessary strength are obtained in response to the function of the turbocharger impeller.

All of the boss portion 31 and the hub portion 32 may be formed as the aluminum first section P1 and all of the blade portion 33 may be formed as the resin second section P2. All of the boss portion 31 may be formed as the aluminum first section P1 and all of the hub portion 32 and the blade portion 33 may be formed as the resin second section P2. Further, as illustrated in the stress distribution of FIG. 5, there is a case in which a high stress part may be generated in the root of the hub portion 32 in the boss portion 31. In response to such a stress distribution, for example, only a part corresponding to the root of the hub portion 32 in the boss portion 31 may be formed as the aluminum first section P1 and the other part of the boss portion 31 may be formed as the resin second section P2.

INDUSTRIAL APPLICABILITY

According to some embodiments of the present disclosure, a turbocharger impeller having low inertia is realized.

REFERENCE SIGNS LIST

1: electric turbocharger (turbocharger), 2: housing, 7: compressor, 8, 8A, 8B: compressor impeller (turbocharger impeller), 31: boss portion, 32: hub portion, 33: blade portion, B: bonding surface, d: radius, D: radius, P1: first section, P2: second section.

The invention claimed is:

1. A turbocharger impeller comprising:
a cylindrical boss portion disposed around a rotary axis;
a hub portion connected to the boss portion and extends in a radial direction of the rotary axis; and
a blade portion protruding from the boss portion and the hub portion toward a tip end side in the direction of the rotary axis and the radial direction,
wherein at least a part of an outer peripheral part of the hub portion in the radial direction or a part of the blade portion is provided with a resin second section and the second section is bonded to an aluminum first section,
wherein a base part of the blade portion connected to the hub portion is formed as the first section and a part protruding from the base part of the blade portion is formed as the second section, and
wherein the aluminum first section and the resin second section constitute the turbocharger impeller.

2. The turbocharger impeller according to claim 1, wherein the second section is provided on an outer peripheral side of the first section.

3. The turbocharger impeller according to claim 2, wherein the second section is provided on an outer peripheral side in relation to a predetermined radius and the first section is provided on an inner peripheral side in relation to the predetermined radius.

4. The turbocharger impeller according to claim 1, wherein the second section is provided in at least an area between the blade portions of the hub portion.

5. The turbocharger impeller according to claim 2, wherein the second section is provided in at least an area between the blade portions of the hub portion.

6. The turbocharger impeller according to claim 3, wherein the second section is provided in at least an area between the blade portions of the hub portion.

7. The turbocharger impeller according to claim 1, wherein a ratio of the second section with respect to all of the first section and the second section increases from the boss portion outward in the radial direction.

8. The turbocharger impeller according to claim 2, wherein a ratio of the second section with respect to all of the first section and the second section increases from the boss portion outward in the radial direction.

9. The turbocharger impeller according to claim 3, wherein a ratio of the second section with respect to all of the first section and the second section increases from the boss portion outward in the radial direction.

10. The turbocharger impeller according to claim 4, wherein a ratio of the second section with respect to all of the first section and the second section increases from the boss portion outward in the radial direction.

11. The turbocharger impeller according to claim 5, wherein a ratio of the second section with respect to all of the first section and the second section increases from the boss portion outward in the radial direction.

12. The turbocharger impeller according to claim 6, wherein a ratio of the second section with respect to all of the first section and the second section increases from the boss portion outward in the radial direction.

* * * * *